United States Patent [19]

Young

[11] Patent Number: 5,853,269
[45] Date of Patent: Dec. 29, 1998

[54] WALLBOARD ELECTRICAL BOX CUTTER HAVING A CUTTING CHAIN

[76] Inventor: Ralph C. Young, 2119 Payton Cir., Colorado Springs, Colo. 80915

[21] Appl. No.: 902,856

[22] Filed: Jul. 30, 1997

[51] Int. Cl.$^6$ .................................................. B23B 51/08
[52] U.S. Cl. .............................. 408/1 R; 408/22; 408/24; 408/30; 30/122; 30/381
[58] Field of Search ................................. 408/22, 24, 25, 408/30, 1 R; 30/122, 381; 7/158

[56] References Cited

U.S. PATENT DOCUMENTS

| | | | |
|---|---|---|---|
| 1,160,675 | 11/1915 | Tropek | 408/25 |
| 2,985,204 | 5/1961 | Kozak | 408/30 |
| 3,833,311 | 9/1974 | Chailer | 408/22 |
| 3,884,280 | 5/1975 | Chailer | 408/22 |
| 4,530,679 | 7/1985 | Reynolds | 30/381 |
| 5,303,477 | 4/1994 | Kuzarov | 30/381 |

Primary Examiner—Daniel W. Howell
Assistant Examiner—Adesh Bhargava
Attorney, Agent, or Firm—G. F. Gallinger

[57] ABSTRACT

There is a need for an efficient cutter to cut openings in drywall for electrical switch and outlet boxes. Existing cutters typically press out an opening and consequently require great hand supplied force and use of a back plate which must be positioned behind the wallboard. The invention discloses a chain driven electrical box cutter for cutting a rectangular opening in wallboard which comprises: a housing having a rectangular chain track therearound; a sprocket positioned centrally within the housing; a shaft positioned within and secured to the sprocket having a cutting end projecting forwardly through the housing, and a drive end projecting rearwardly through the housing; a loop of chain positioned within the track and on the sprocket so that it may be driven thereby, said chained carrying cutting teeth adapted to cut in a direction towards the front of the housing; so that when the shaft is turned its cutting end cuts a guide hole in a wallboard, and its chain teeth thereafter cut a shape in the wallboard corresponding to the rectangular chain track.

15 Claims, 1 Drawing Sheet

WALLBOARD ELECTRICAL BOX CUTTER HAVING A CUTTING CHAIN

FIELD OF INVENTION

This invention relates to a method and apparatus for cutting openings in wallboard for electrical switch and outlet boxes.

BACKGROUND OF THE INVENTION

When a building is erected it is necessary to cut openings in the wallboard to provide access to the electrical switch and outlet boxes mounted on the studs. The conventional method of cutting openings comprises measuring the position of the electrical box on the wall; then correspondingly marking a sheet of wallboard which is to be mounted on the wall over the box; cutting an opening with a saw; then positioning the wallboard on the wall over the electrical box; and finally, making adjustments to the opening size before finally securing the wallboard to the wall. It is both a time consuming and an error prone process. And furthermore, straining to lift and position the heavy wallboard more than once is tiring.

There is a need for an easier and quicker way to position and cut wallboard to mount over electrical boxes. This need has been recognized by several inventors. Their inventions to cut openings in wallboard for electrical boxes have primarily entailed devices which press out a portion of the wallboard. One problem with these devices is that such pressing requires great force. It is extremely fatiguing to provide this squeezing force by hand. Another problem with these devices is that they generally require a back member which must be position on the back side of the board, opposite to the side on which one is cutting. It is generally not possible to press out the opening for the electrical box while the wallboard is in position on the wall.

OBJECTS AND STATEMENT OF INVENTION

It is an object of this invention to disclose an apparatus with which one may efficiently cut an opening in wallboard for an electrical switch or outlet box. It is an object of this invention to disclose an apparatus which permits the cutting of an opening in a sheet of positioned wallboard without the necessity of using a back member, or without the need to generate great force to press out a portion of the wallboard. It is a further object of this invention to disclose an apparatus which will cut out a precisely shaped opening which has unbroken, sharply cut edges. It is a final object of this invention to disclose a method of cutting electrical outlet and switch box openings in erected wallboard without the necessity of the error prone process of measuring and marking; a method which will not only reduce errors and reduce lifting labor, but most importantly a method which will reduce erection time to a fraction of time required by conventional methods.

One aspect of this invention provides for a chain driven electrical box cutter for cutting a rectangular opening in wallboard which comprises: a housing having a rectangular chain track therearound; a sprocket positioned centrally within the housing; a shaft positioned within and secured to the sprocket having a cutting end projecting forwardly through the housing, and a drive end projecting rearwardly; a loop of chain positioned within the track and on the sprocket so that it may be driven thereby, said chained carrying cutting teeth adapted to cut in a direction towards the front of the housing; so that when the shaft is turned its cutting end cuts a guide hole in a wallboard, and its chain teeth thereafter cut a shape in the wallboard corresponding to the rectangular chain track.

Another aspect of this invention provides for a cutter as above wherein the teeth comprise chisel shaped elongated members each having a length exceeding the thickness of the wallboard. The teeth are carried by a sprocket type chain and replace pins in the connecting links thereof.

Various other objects, advantages and features of novelty which characterize this invention are pointed out with particularity in the claims which form part of this disclosure. For a better understanding of the invention, its operating advantages, and the specific objects attained by its users, reference should be made to the accompanying drawings and description, in which preferred embodiments of the invention are illustrated.

FIGURES OF THE INVENTION

The invention will be better understood and objects other than those set forth will become apparent to those skilled in the art when consideration is given to the following detailed description thereof. Such description makes reference to the annexed drawings wherein.

Figures 1, 2:
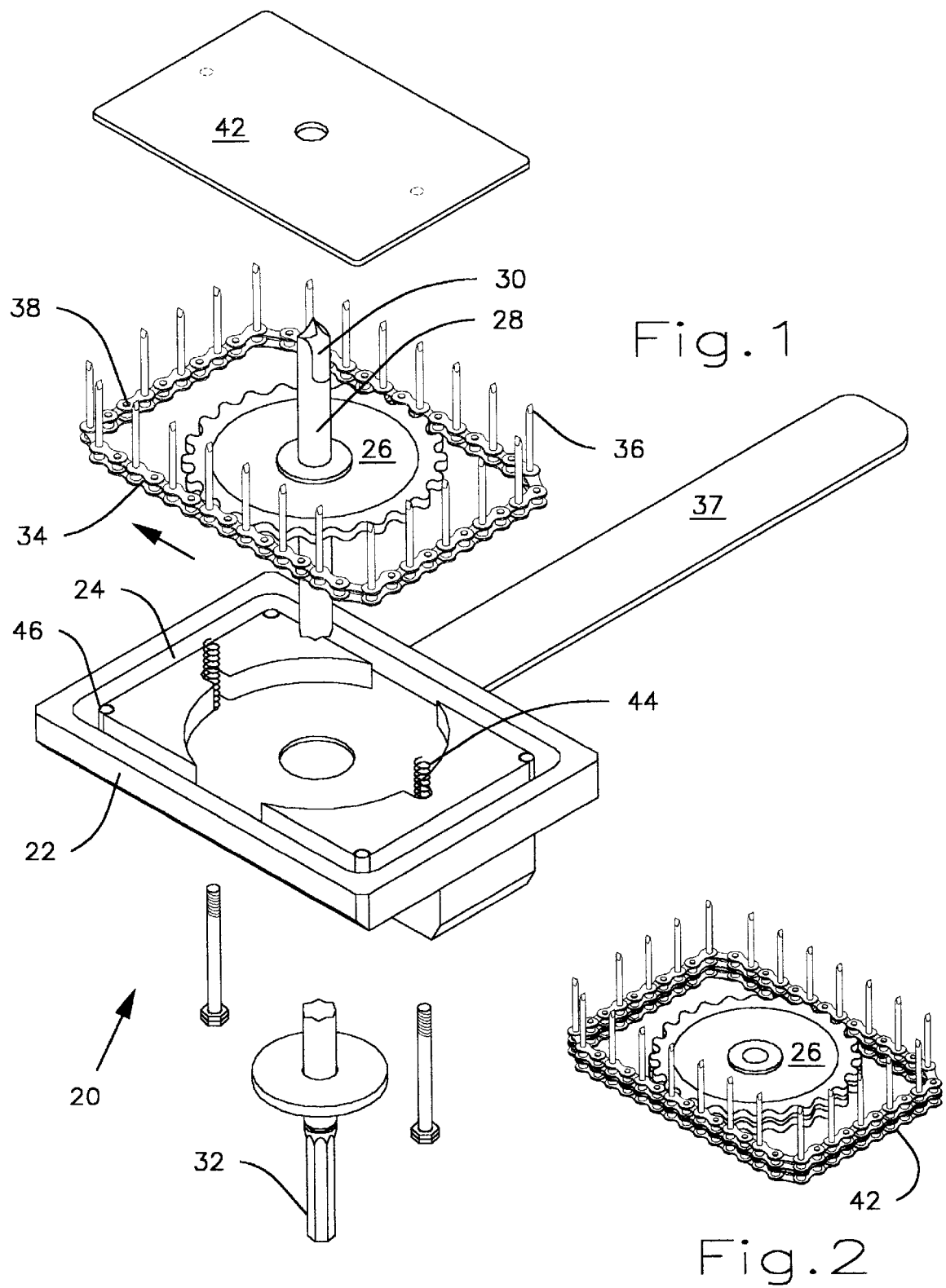
FIG. 1 is an exploded view of a chain driven wallboard electrical box cutter.
FIGS. 2 shows an optional alternate design—a double width chain and sprocket—for use in the cutter shown in FIG. 1.

The following is a discussion and description of the preferred specific embodiments of this invention, such being made with reference to the drawings, wherein the same reference numerals are used to indicate the same or similar parts and/ or structure. It should be noted that such discussion and description is not meant to unduly limit the scope of the invention.

DESCRIPTION OF THE INVENTION

Turning now to the drawings and more particularly to FIG. 1 we have an exploded view of a chain driven wallboard electrical box cutter 20. The chain driven cutter 20 for cutting a predetermined shaped comprises: a housing 22 having a chain track 24 outlining the predetermined shape; a sprocket 26 positioned centrally within the housing 22; a shaft 28 positioned within and secured to the sprocket 26, said shaft 28 having a cutting end 30 projecting forwardly through the housing 22, and a drive end 32 projecting rearwardly; a loop of chain 34 positioned within the track 24 and on the sprocket 26 so that it may be driven thereby, said chain 34 carrying cutting teeth 36 adapted to cut in a direction towards the front of the housing 22. When the shaft 28 is turned its cutting end 30 may be used to cut a guide hole in a wallboard (neither shown) and its chain teeth 34 thereafter cut the predetermined shape corresponding to the chain track 24. The chain driven cutter 20 has been found to be particularly effective when designed with a housing 22 having a rectangular chain track 24 so that the cutter cuts a predetermined shape corresponding to the size of a single width electrical switch or outlet box (neither shown).

Most preferably a handle member 37, adapted to hold the housing 22, is attached thereto. The teeth 36 are elongated members each having a length exceeding the thickness of the wallboard (not shown). Most preferably the teeth 36 have a chisel shaped end portion. The teeth 36 replace every second pin 38 in the connecting links of the sprocket chain 34. The chain 34 may be of the single width variety for use with a sprocket 26 having a single row of chain teeth 40 therearound.

FIGS. 2 shows an optional alternate design—a double width chain 34 and sprocket 26—for use in the cutter 20 shown in FIG. 1. Most preferably, the sprocket 26 has double rows of teeth 40 therearound and the chain 34 has double width links 42 to provide better lateral support for the cutting teeth 36. In the most preferred embodiment of the invention a spring 44 loaded tooth guide plate 42, which has a shape corresponding to the rectangular opening (not shown) to be cut, is initially positioned between the end portions of the teeth 36, and is adapted to depress as the teeth 36 cut deeper into the wallboard (not shown). The chisel shaped teeth 36 are obliquely turned so that they will press inwardly against an outside edge of the guide plate 42 as they cut.

To reduce costs the housing 22 and the gear 26 may be fabricated from plastic. To reduce wear interior corner chain wear posts 46 are provided. It is contemplated that the cutter 20 may include a rotary drive means (not shown) mechanically coupled to the drive end 32 of the shaft 28 of the cutter 20. The housing of the drive means (not shown) could be connected to the housing 22 to facilitate handling.

A method of cutting an electrical box opening in drywall with an electrical drill (none shown) comprises the following steps: determining the position of the electrical box opening (not shown) to be cut; mechanically connecting the drill (not shown) to a drive end 30 of a shaft 28 of a cutter 20 of the type having a housing 22 containing a rectangular chain track 24 therearound; a sprocket 26 positioned centrally within the housing; a shaft 28 positioned within and secured to the sprocket 26 having a cutting end 30 projecting forwardly through the housing 22, and a drive end 32 projecting rearwardly through the housing 22; a loop of chain 42 positioned within the track 24 and on the sprocket 26 so that it may be driven thereby, said chain 34 carrying cutting teeth 36 adapted to cut in a direction towards the front of the housing 22; so that when the shaft 28 is turned its cutting end 30 cuts a guide hole in a wallboard (neither shown), and its chain teeth 36 thereafter cut a shape in the wallboard (not shown) corresponding to the rectangular chain track 24.

The drill (not shown) in the method above is defined to include any type of rotary driver. The method is intended to include the use of a cutter 20 in which a drill or drive means (not shown) is integral thereto. The wallboard (not shown) may, or may not be attached to the wall prior to cutting. The electrical wires (not shown) may—as in the case of new construction, be in the wall; or alternatively, as in the case of retrofitting, not be in the wall.

While the invention has been described with preferred specific embodiments thereof, it will be understood that this description is intended to illustrate and not to limit the scope of the invention. The optimal dimensional relationships for all parts of the invention are to include all variations in size, materials, shape, form, function, assembly, and operation, which are deemed readily apparent and obvious to one skilled in the art. All equivalent relationships to those illustrated in the drawings, and described in the specification, are intended to be encompassed in this invention. What is desired to be protected is defined by the following claims.

I claim:

1. A chain driven cutter for cutting a predetermined shaped comprising:

a housing having a chain track outlining the predetermined shape;

a sprocket positioned centrally within the housing;

a shaft positioned to and secured to the sprocket having a cutting end projecting forwardly through the housing, and a drive end projecting rearwardly;

a loop of chain positioned within the track and on the sprocket so that it may be driven thereby, said chain carrying cutting teeth adapted to cut in a direction towards the front of the housing;

so that when the shaft is turned its cutting end may be used to cut a guide hole in a wallboard and its teeth carried by the chain thereafter cut the predetermined shape corresponding to the chain track.

2. An electrical box cutter for cutting a rectangular opening in wallboard comprising:

a housing having a rectangular chain track therearound;

a sprocket positioned centrally within the housing;

a shaft positioned within and secured to the sprocket having a cutting end projecting forwardly through the housing, and a drive end projecting rearwardly through the housing;

a loop of chain positioned within the track and on the sprocket so that it may be driven thereby, said chain carrying cutting teeth adapted to cut in a direction towards the front of the housing;

so that when the shaft is turned its cutting end cuts a guide hole in a wallboard, and its chain teeth thereafter cut a shape in the wallboard corresponding to the rectangular chain track.

3. A cutter as in claim 2 further comprising a handle member adapted to hold the housing.

4. A cutter as in claim 3 wherein the teeth comprise elongated members each having a length exceeding the thickness of the wallboard.

5. A cutter as in claim 4 wherein the teeth have a chisel shaped end portion.

6. A cutter as in claim 5 wherein the teeth replace pins connecting links of the chain.

7. A cutter as in claim 6 further comprising a spring loaded tooth guide plate, said guide plate having a shape corresponding to the rectangular opening which is to be cut, said plate initially positioned between the end portions of the teeth, and adapted to depress as the teeth cut deeper into the wallboard.

8. A cutter as in claim 7 wherein the teeth are turned so that they will press inwardly against an outside edge of the guide plate as they cut.

9. A cutter as in claim 8 wherein the housing is fabricated from plastic and further comprises interior corner chain wear posts.

10. A cutter as in claim 8 wherein the sprocket has a single row of teeth therearound.

11. A cutter has in claim 8 wherein the sprocket has double rows of teeth therearound and wherein the chain has double width links to provide better support for the cutting teeth.

12. A method of cutting an electrical box opening in drywall with an electrical drill comprising the following steps:

determining the position of the electrical box opening to be cut;

mechanically connecting the drill to a drive shaft of a cutter of the type having a housing having a rectangular chain track therearound; a sprocket positioned centrally within the housing; a shaft positioned within and secured to the sprocket having a cutting end projecting forwardly through the housing, and a drive end projecting rearwardly through the housing; a loop of chain positioned within the track and on the sprocket so that it may be driven thereby, said chain carrying cutting teeth adapted to cut in a direction towards the front of the housing;

so that when the shaft is turned its cutting end cuts a guide hole in a wallboard, and its chain teeth thereafter cut a shape in the wallboard corresponding to the rectangular chain track.

13. A method as in claim 12 wherein the wallboard is permanently attached to a wall prior to cutting.

14. A method as in claim 13 wherein an electrical cable is positioned in the wall behind where the opening is to be cut prior to the attachment of the wallboard to the wall.

15. A method as in claim 14 wherein the cutter is held by a handle member attached to the housing.

\* \* \* \* \*